(12) United States Patent
Yanase

(10) Patent No.: US 6,235,979 B1
(45) Date of Patent: May 22, 2001

(54) MUSIC LAYOUT DEVICE AND METHOD

(75) Inventor: Tsutomu Yanase, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/311,612

(22) Filed: May 13, 1999

(30) Foreign Application Priority Data

May 20, 1998 (JP) .................................................. 10-138428

(51) Int. Cl.[7] .............................. G09B 15/02; G10H 7/00
(52) U.S. Cl. ........................ 84/477 R; 84/609; 84/483.2; 84/DIG. 6
(58) Field of Search ...................... 84/609–613, 622–625, 84/628, 634–638, 649–652, 659–660, 477 R, 478, 483.1, 483.2, DIG. 6

(56) References Cited

U.S. PATENT DOCUMENTS

| | | | |
|---|---|---|---|
| 4,506,587 | * 3/1985 | Tanaka | 84/477 R |
| 4,512,229 | * 4/1985 | Kamiya et al. | 84/609 |
| 5,690,496 | * 11/1997 | Kennedy | 84/610 |

* cited by examiner

*Primary Examiner*—Robert E. Nappi
*Assistant Examiner*—Marlon T. Fletcher

(74) *Attorney, Agent, or Firm*—Morrison & Foerster

(57) ABSTRACT

Performance data for a plurality of parts are received, and timing data included in the performance data for these parts are combined together to provide a time series data common to the parts. Layout of individual measures and layout of notes within each of the measures and beats are determined on the basis of the combined timing information, so that the thus-determined layout is defined as a common layout for shared use in the individual parts. In accordance with the common layout, note marks are allocated to rows of staves corresponding to the parts on the basis of the part-specific performance data. Thus, it is possible to achieve musical score layout having an enhanced appearance with all the corresponding beat positions (time axes) of the rows of staves accurately aligned with each other. Further, each ornament is detected from among the performance data so that the ornament note group is presented on the staves using a predetermined ornament mark. In addition, the notes represented by the performance data relating to the ornament are subjected to a quantization process, and these notes are presented on the staves in a combination of the ornament mark and note marks of the quantized data. Furthermore, each note group corresponding to an arpeggio or glissando performance is detected from among the performance data so that the note group is presented on the staves in a combination of a predetermined performance style mark and marks representative of the notes.

24 Claims, 10 Drawing Sheets

DUMMY DATA

4 MEASURES, EQUAL WIDTH

4 MEASURES, VARIABLE WIDTH

3 MEASURES, EQUAL WIDTH + 5 MEASURES, VARIABLE WIDTH

MUSIC LAYOUT DEVICE AND METHOD

BACKGROUND OF THE INVENTION

The present invention relates to a music layout device and method suitable for visually displaying music or musical score based on performance data in electronic musical instruments and computer music facilities, as well as a recording medium containing a program for use in such music layout.

Conventional automatic performance data for use in electronic musical instruments and computer music facilities are generally constructed in such a format where data designating a pitch of each tone to be generated etc. are combined with information indicative of specific timing for generating or deadening the tone. Specifically, the timing information represents a time point of a performance event, a time interval between the events, or the like. To visually display music or musical score based on such automatic performance data, it is, in principle, necessary to identify particular types of individual notes and rests. The types of the notes and rests can also be identified on the basis of duration of each tone (i.e., tone-generation lasting period) and time intervals between successive tone-generation timing through analysis of the automatic performance data. Further, a vertical position of each note on a staff can be identified from its pitch, while a horizontal position of the note on the staff can be identified from its length with a certain degree of accuracy.

However, the displayed width of some note marks do not necessarily correspond linearly (proportionally) to the predetermined actual length of the notes; for example, although a quarter note is greater in actual length than an eighth note, it would have a smaller displayed width than that of the eighth note because the latter has a so-called "hook". Due to the lack of the exact linear or proportional correspondence between the displayed width of the note mark and the actual note length, notating or allocating given notes on the staff on the basis of their actual lengths alone may undesirably result in the note marks overlapping each other. Thus, there has been a need to allocate the individual notes on the staff on a measure-by-measure basis in such a manner that their respective note marks do not overlap each other.

When a performance of a plurality of parts is to be represented in musical notation, a musical score is generally used which is constructed of a plurality of rows of staves corresponding to the parts. Piano score, for example, comprises two staves: a first staff for the lower range (left-hand) performance that is represented by the "F clef"; and a second staff for the upper range (right-hand) performance that is represented by the "G clef". However, in such a case where the musical score is expressed by the plurality of rows of staves based on automatic performance data for the plurality of parts, the above-mentioned approach of allocating individual notes while preventing overlaps of their respective note marks alone would unavoidably lead to considerable degradation in the external appearance of the score; namely, because the performance data normally differ between the parts, the corresponding beat positions in the rows of staves would deviate or misalign from each other, so that the displayed musical score tends to be difficult to read.

Further, the automatic performance data also contain data designating grace notes or other ornaments, such as arpeggio or glissando, which are similar to the data of independent notes. Thus, allocating the automatic performance data directly on the staves would cause significant inconveniences. For example, the glissando data would result in a number of notes being densely packed within a short time period; thus, if the musical score is displayed with no particular modification, considerable overlap between the notes would occur, thus making it even more difficult to read the notes on the displayed score. To prevent such overlap between the notes, there arises an additional need to considerably increase the displayed width (horizontal length) of each measure.

SUMMARY OF THE INVENTION

It is therefore an object of the present invention to provide a music layout device and method which allow music to be displayed with an enhanced appearance, as well as a recording medium for use in such music layout.

In order to accomplish the above-mentioned object, the present invention provides a music layout device for allocating score marks to a plurality of rows of staves on the basis of performance data for a plurality of parts including timing information of performance events. This music layout device is characterized in that the timing information included in the performance data for the plurality of parts is combined to determine respective positions of notes on the basis of the combined timing information, and note marks are allocated to the rows of staves corresponding to the parts in light of the thus-determined positions of notes.

According to the invention, the timing information included in the performance data for the plurality of parts is combined or synthesized to determine the placement or respective positions of notes on the basis of the combined timing information, and score marks are allocated to the rows of staves corresponding to the parts in light of the thus-determined note placement. Thus, the allocation of the note marks to the rows of staves corresponding to parts can be executed with predetermined unity between the individual parts. This arrangement readily allows a musical score to be displayed with an enhanced appearance with corresponding beat positions (time axes) etc. of the staves accurately aligned with each other.

According to another aspect of the present invention, there is provided a music layout device for allocating score marks to a staff on the basis of performance data for a plurality of parts including timing information of performance events, which is characterized in that an ornament is detected from among the performance data on the basis of the timing information included in the performance data, the performance data are modified in response to detection of the ornament, and an ornament mark corresponding to the detected ornament and note marks corresponding to the modified performance data are allocated to the staff. With this arrangement, the ornament region (i.e., ornament note group) can be represented by a corresponding ornament mark rather than directly by the original performance data, and thus a musical score can be displayed with an enhanced appearance.

According to still another aspect of the present invention, there is provided a music layout device for allocating score marks to a staff on the basis of performance data for a plurality of parts including timing information of performance events, which comprises: a detection section that detects, from among the performance data, a note group corresponding to a glissando performance style on the basis of the timing information included in the performance data; a conversion section that converts the performance data relating to the note group corresponding to the detected glissando performance; and a section that allocates, to the staff, a predetermined glissando mark and note marks corresponding to the performance data converted by the conversion section, as score marks corresponding to the detected note group. Because each note group corresponding to a glissando performance style is detected and the detected note group is presented on the staff in a combination of the predetermined glissando mark and note marks corresponding to the converted performance data rather than directly by the original performance data, the present invention achieves simplified display of a musical score having an enhanced appearance which is very easy to read.

According to still another aspect of the present invention, there is provided a music layout device for allocating score marks to a plurality of rows of staff on the basis of performance data for a plurality of parts including timing information of performance events, which comprises: a detection section that detects, from among the performance data, a note group corresponding to an arpeggio performance style on the basis of the timing information included in the performance data; a conversion section that converts the performance data relating to the note group corresponding to the detected arpeggio performance style; and a section that allocates, to the staff, a predetermined arpeggio mark and note marks corresponding to the performance data converted by the conversion section, as score marks corresponding to the detected note group. In this case too, each note group corresponding to an arpeggio performance style is detected and the detected note group is presented on the staff in a combination of the predetermined arpeggio mark and note marks corresponding to the converted performance data rather than directly by the original performance data, so that the present invention achieves simplified display of a musical score having an enhanced appearance which is very easy to read.

According to still another aspect of the present invention, there is provided a music layout device for allocating score marks to a staff on the basis of performance data for a plurality of parts including timing information of performance events, which comprises: a detection section that detects, from among the performance data, a note group corresponding to an ornament on the basis of the timing information included in the performance data; a section that determines a position of each note to be quantized in accordance with the detected ornament to thereby carry out a quantization process on the performance data; and a section that allocates, to the staff, an ornament mark corresponding to the detected ornament and note marks corresponding to the performance data having been subjected to the quantization process. In this case, each note group corresponding to an ornament is detected, and the performance data corresponding to the detected ornament are subjected to the quantization process. Thus, the detected ornament and the performance data corresponding thereto can be presented on the staff in a combination of the ornament mark and note marks of the quantized performance data, with the result that a musical score can be displayed with an enhanced appearance. Note that the "quantization" process is intended to correct deviation of tone-generation timing of the performance data; more particularly, it is directed to adjusting the tone-generation timing into an accurate position corresponding to the beat, or adjusting the degree of the timing correction so as to achieve accurate tone-generation timing.

The present invention may be implemented not only as a "device" invention but also as a "method" invention. The present invention may also be practiced as a computer program and a recording medium storing such a computer program.

BRIEF DESCRIPTION OF THE DRAWINGS

For better understanding of the object and other features of the present invention, its preferred embodiments will be described in greater detail hereinbelow with reference to the accompanying drawings, in which.

DETAILED DESCRIPTION OF THE PREFERRED EMBODIMENTS

Figure 9:
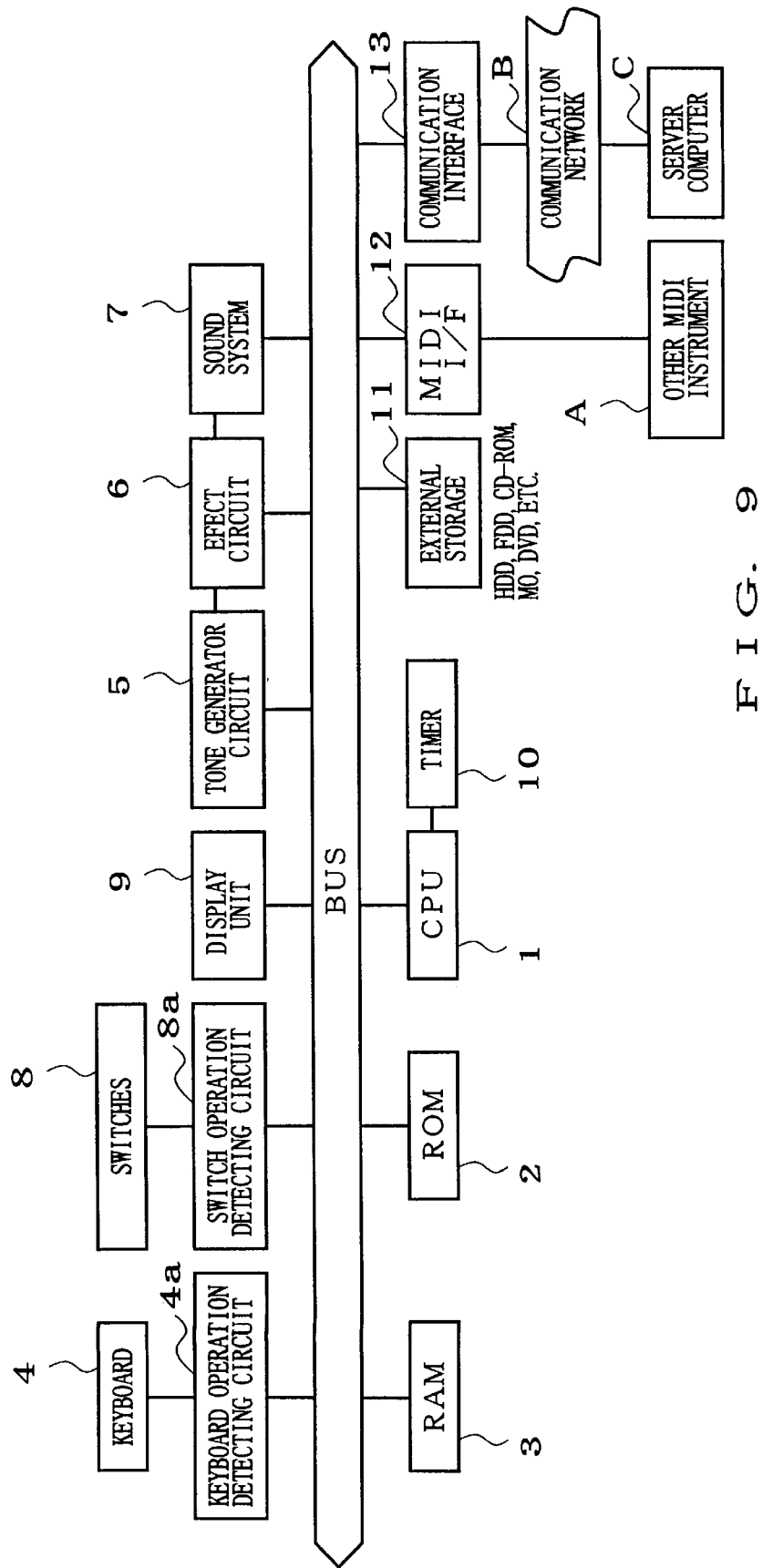
FIG. 9 is a hardware block diagram of an electronic musical instrument employing a music layout device in accordance with the preferred embodiment of the present invention, as well as a network system to which the electronic musical instrument is connected.

FIG. 9 is a hardware block diagram of an electronic musical instrument employing a music layout device in accordance with an embodiment of the present invention, as well as a network system to which the electronic musical instrument is connected. In FIG. 9, a CPU 1 controls various operations to be carried out in the entire electronic musical instrument, on the basis of various control programs stored in a ROM 2 and using working areas of a RAM 3. During performance on a keyboard 4, the CPU 1 receives note numbers, key-on signals, etc. from the keyboard 4 via a keyboard operation detecting circuit 4a and then supplies a tone generator circuit 5 with the note numbers, velocities, and note-on/off event data, to thereby carry out tone generating and tone deadening processing. The tone generator circuit 5 generates tone signals based on the supplied data and signals, and each of the thus-generated tone signals is imparted a desired tonal effect by an effect circuit 6 and then audibly reproduced or sounded through a sound system 7. Further, a timer 10 generates interrupt signals (clock pulse signals) to be given to the CPU 1 during various processes such as an automatic performance process.

Various switches 8 are provided on an operation panel of the electronic musical instrument, and the CPU 1 receives various input data from the switches 8 via a switch operation detecting circuit 8a and carries out various processes corresponding to the activated or operated switches. The switches 8 in the embodiment include an automatic performance start/stop switch, a cursor moving switch for manipulation of data and etc. on a screen of a display unit 9. The display unit 9 includes a liquid crystal display (LCD) panel and/or the like, and user's input operation etc. in the embodiment can be performed using the so-called GUI (Graphical User Interface) in combination with the liquid crystal display panel and/or the like as well as the switches 8. Examples of various processes performed in the embodiment using such a GUI include a process for selecting and loading automatic performance data, a process for displaying a musical score based on the automatic performance data, and a process for saving the automatic performance data and musical score forming data.

Once the musical score display process is designated, the CPU 1 determines layout of the musical score and creates musical score forming data. Also, on the basis of the musical score forming data, the CPU 1 creates score image data corresponding to a screen size and resolution (the number of pixels in the vertical and horizontal directions) of the crystal liquid display panel in the display unit 9 and feeds the score image data to the display unit 9. In this way, a picture of the musical score is displayed on the crystal liquid display panel. The display device employed in the display unit 9 for visually showing the musical score may, of course, be a CRT display or other electronic display, or other type of display for visually showing the score on a paper by means of a printer.

The electronic musical instrument also includes an external storage unit 11 that may include a hard disk device (HDD), floppy disk device (FDD), CD-ROM device, magneto-optical (MO) disk device, digital versatile disk (DVD) device and/or the like, and this external storage unit 11 can be used for both entry and storage of various data such as automatic performance data. MIDI interface (I/F) 12 is provided for exchange of various data, such as automatic performance data, with another MIDI instrument. Communication interface 13 is connected to a communication network B so as to receive, from a server computer C, various data such as automatic performance data.

The automatic performance data received from the external storage unit 11 or MIDI interface 12 are stored into predetermined areas of the RAM 3, so that the musical score display process or automatic performance process is carried out on the basis of the automatic performance data thus-stored in the RAM 3. Alternatively, such automatic performance data may be entered in real time by a manual performance operation on the keyboard 4, or may be entered, on a tone-by-tone basis, using the so-called "step recording" scheme based on operation of the keyboard 4 and switches 8.

Automatic Performance Data

Figure 10:
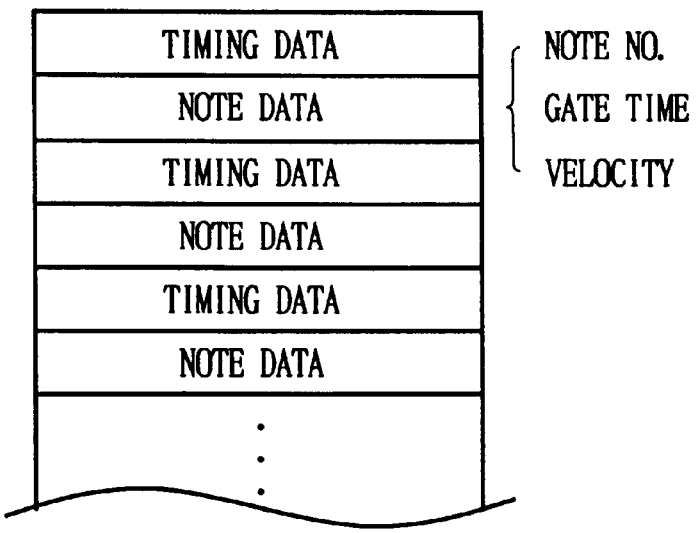
FIG. 10 is a diagram showing an exemplary format of performance data employed in the preferred embodiment.
Figures 11A, 11B, 11C, 11D:
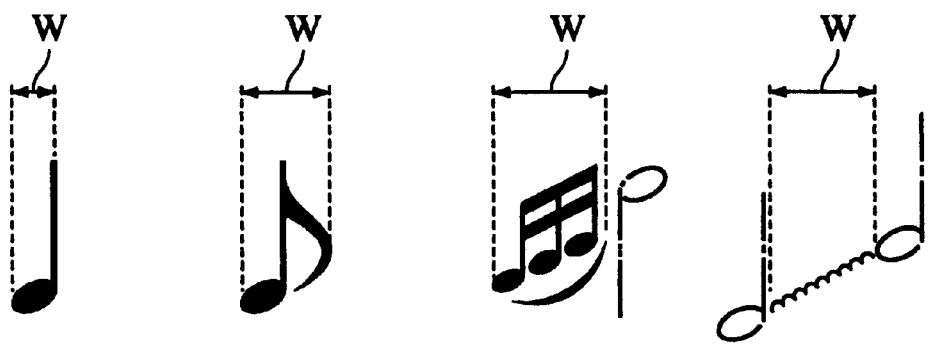
FIGS. 11A to 11F are diagrams showing examples of various score marks and their respective displayed widths in the preferred embodiment.
Figures 11E, 11F:
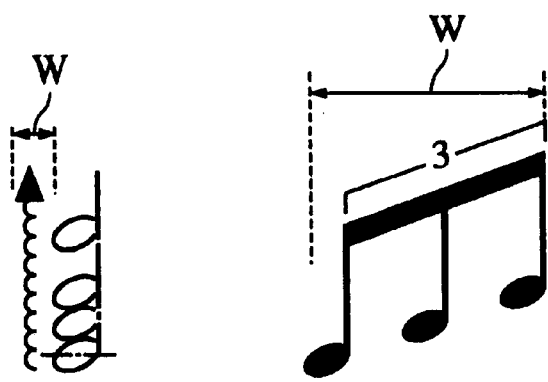

The automatic performance data represent time-axial positions (elapsed absolute time values) of individual notes from a start point of a music piece or measure by clock values (having an accuracy equal to $1/96$ of a quarter note). As exemplarily shown in FIG. 10, the automatic performance data consist of a time series of note data, each of which corresponds to a single tone and is combined with timing data indicating, in a clock value, generation (i.e., sounding) timing of the tone. Each of the note data includes gate time data indicating duration of the generated tone in a clock value and velocity data representative of a volume of the tone.

Image Data of Score Mark

In the RAM 3, there are stored image data indicative of respective patterns of various musical or score marks such as those of notes, rests, ornaments, staves, clefs and cadences. Also, as typically shown in FIGS. 11A–11F, respective horizontal displayed widths W of the patterns of the notes and other score marks are each stored, in the RAM 3, as data of a particular number of pixels on the liquid crystal display panel. These image data and displayed widths W, which are described here as supplied from the external storage unit 11 and then stored in the RAM 3, may be prestored in the ROM 2.

Figure 12:
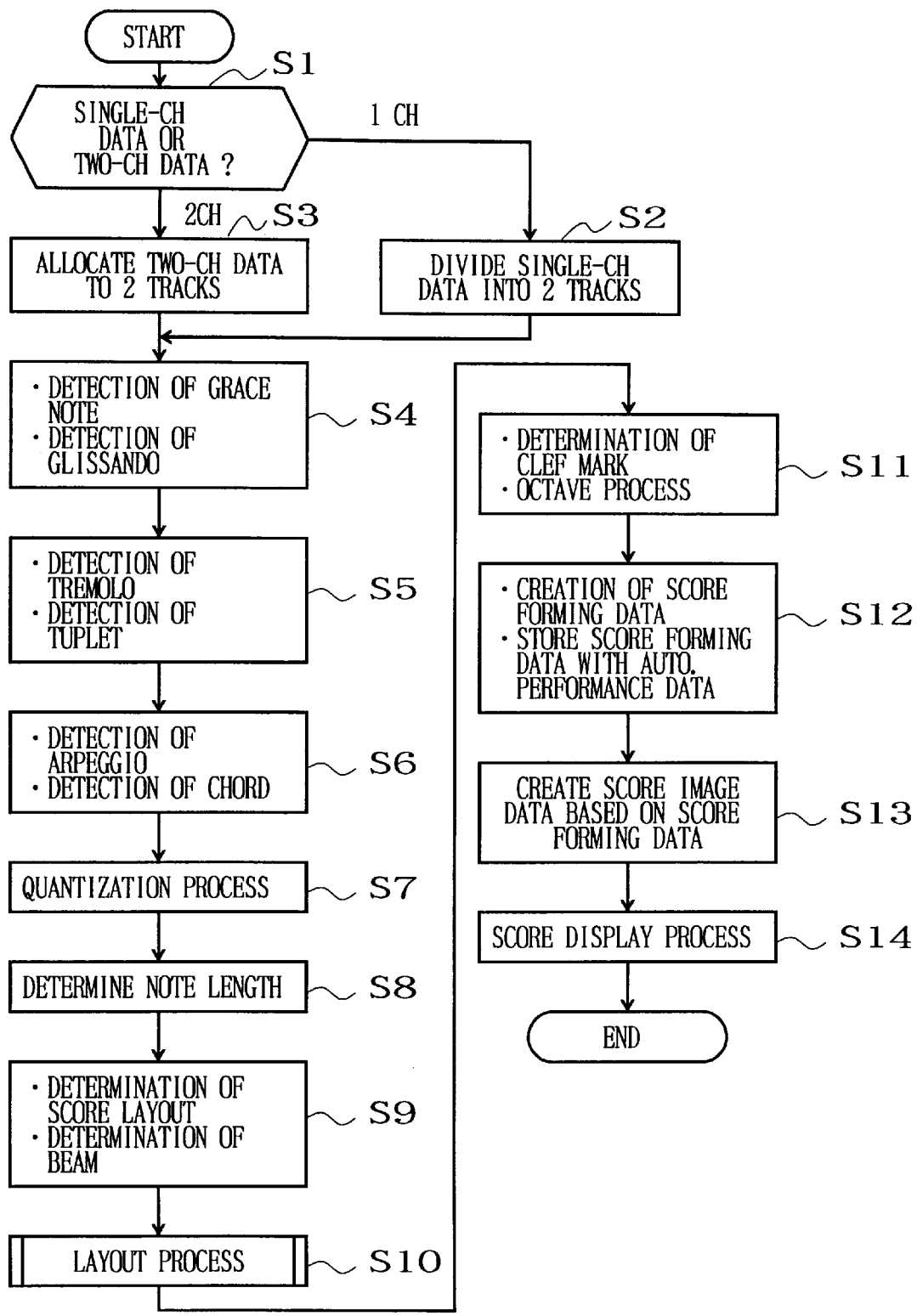
FIG. 12 is a flow chart illustrating an example of a main control program carried out in the preferred embodiment of the present invention.
Figure 13:
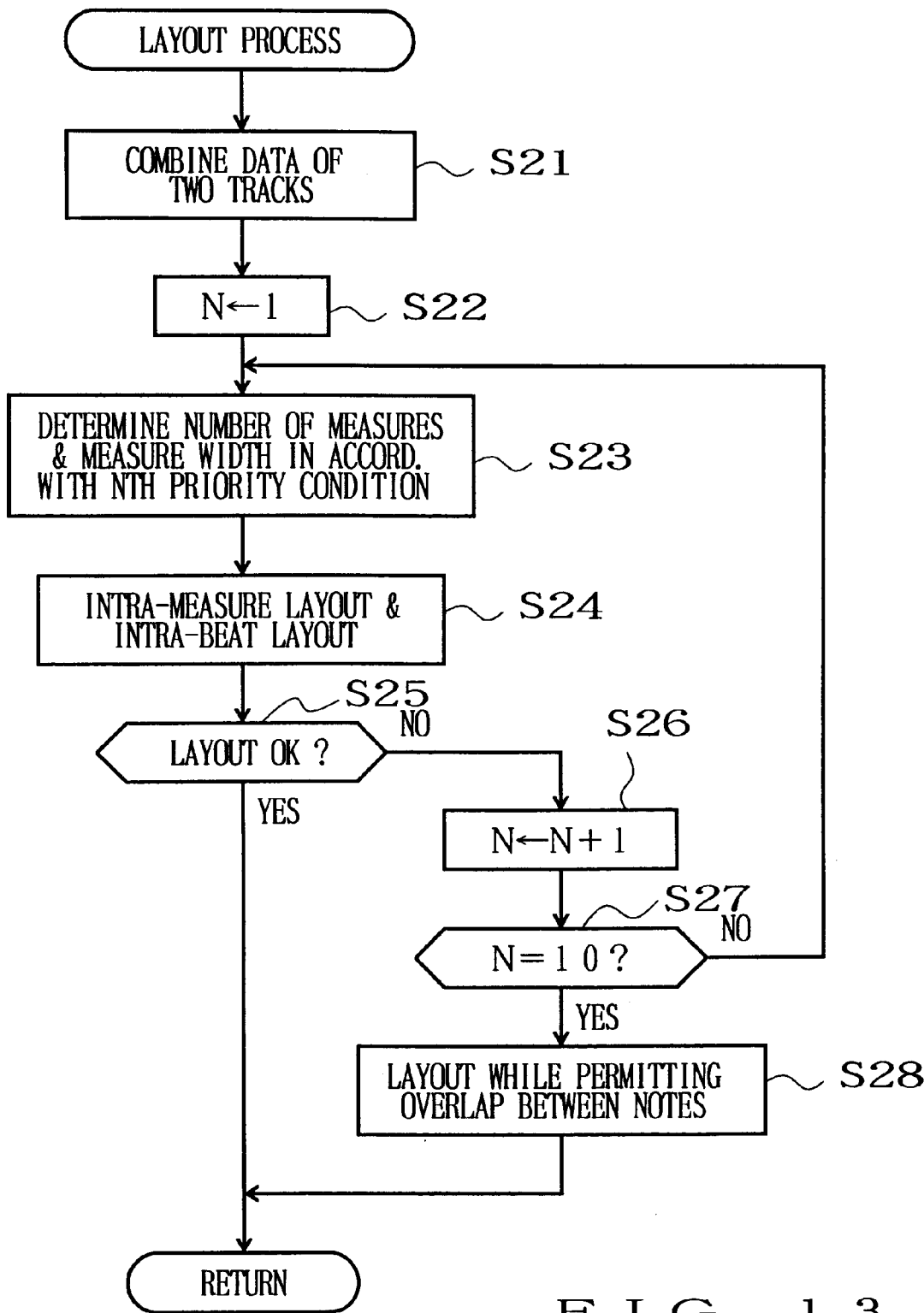
FIG. 13 is a flow chart of a layout process carried out in the preferred embodiment.

FIG. 12 is a flow chart illustrating a main control program or main routine executed in the preferred embodiment of the present invention, and FIG. 13 is a flow chart of a layout process that is a subroutine of the main control program of FIG. 12. The music layout program in accordance with the preferred embodiment is contained in the main routine and subroutine. Behavior of the embodiment will be described below mainly with reference to these flow charts. Processing based on the main routine is triggered when a desired set of automatic performance data is selected and stored in a predetermined area of the RAM 3 and the musical score display process is designated. Principal portions of the individual flow charts will be later described in detail.

The instant embodiment employs two major types of automatic performance data sets: a single-channel type where performance data for two parts are mixed in a single channel ("CH"); and a two-channel type where performance data of two parts are divided into two separate channels. Thus, at first step SI of the main routine, a determination is made as to whether the selected automatic performance data set is of the single-channel type or the two-channel type. If the selected automatic performance data set is of the single-channel type, then the program goes to step S2, where the automatic performance data are divided into two tracks, i.e., an upper range track and a lower range track, on the basis of pitches of the automatic performance data and stored into the RAM 3 in the divided form. If the selected automatic performance data set is of the two-channel type, the program goes to step S3, where the two-channel automatic performance data are each allocated to one of the upper and lower pitch range tracks and stored into the RAM 3; for example, the automatic performance data of one of the channels having a higher average pitch may be allocated to the upper pitch range track while the automatic performance data of the other channel having a lower average pitch may be allocated to the lower pitch range track. This way, the automatic performance data for each of the parts are stored as two- track performance data.

Then, at step S4, detection is made of grace notes and glissando from among the performance data for each of the tracks, and at next step S5, detection is made of a tremolo and tuplet from among the performance data for each of the tracks. Further, at step S6, detection is made of an arpeggio and chord (i.e., simultaneous generation of chord component notes), and a quantization process is carried out at following step S7.

The following paragraphs describe examples of ornament detection processes carried out at steps S4 to S6. Note that each of tones corresponding to individual note data will be hereinbelow referred to as a "note". Also, of two given successive notes, one of the notes having earlier note-on timing will be called an "(n−1)th note" and the other note having later note-on timing will be called an "nth note". If the two notes have same note-on timing, one of the notes having earlier note-off timing will be called the "(n−1)th note" and the other note having later note-off timing will be called the "nth note". Further, in case the two notes have same note-on and note-off timing, an optionally-selected one of the notes will be called the "(n−1)th note" and the other note will be called the nth note. Such ordinal numbers will be used below as suffixes to characters representing notes, such as in "$G_n$, $G_{n-1}$".

Detection of Grace note and Glissando

Figure 14:
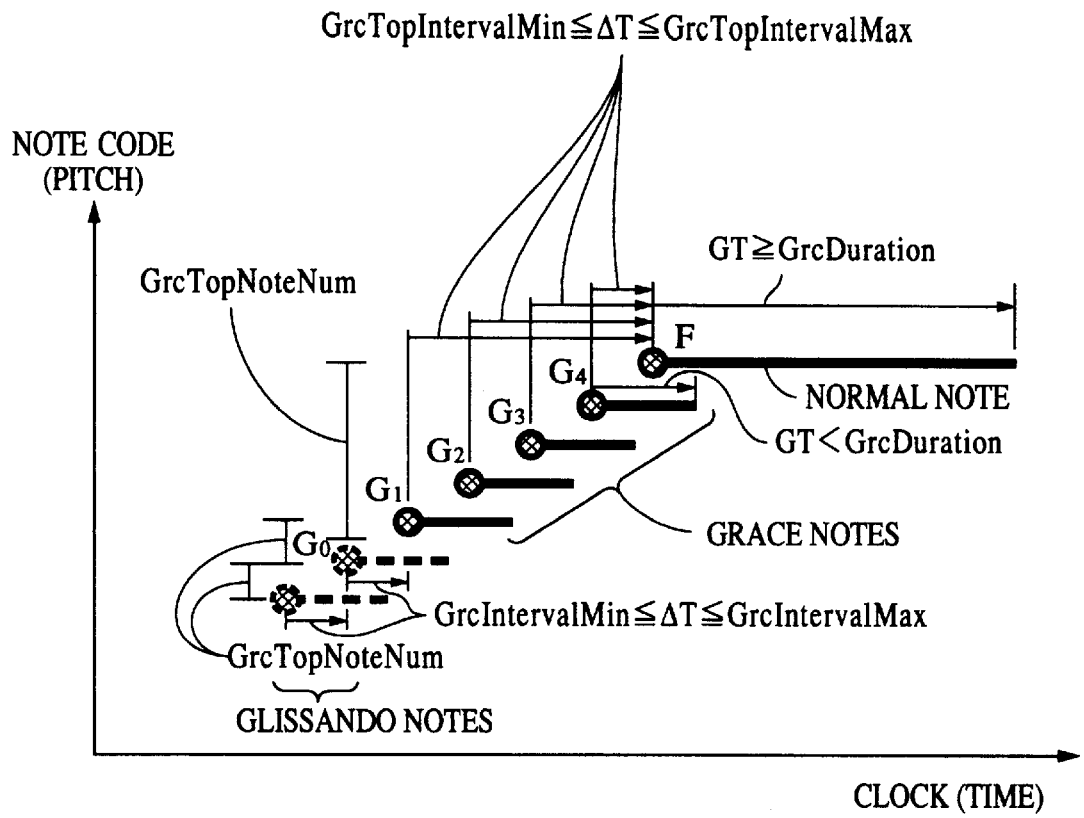
FIG. 14 is a diagram explanatory of a process for detecting grace notes and glissando in the preferred embodiment.

FIG. 14 is a diagram explanatory of an example of the process carried out in the embodiment for detecting grace notes and glissando, where the horizontal axis represents clock value corresponding to time while the vertical axis represents note number corresponding to tone pitch. Further, in FIG. 14, round marks represent respective key-on timing of notes F, $G_4$, $G_3$, . . . , and horizontal bars extending from the round marks represent respective duration (gate times) of the notes F, $G_4$, $G_3$, . . . . Also, in the illustrated example of FIG. 14, the following preset values are used to prescribe various conditions for the detection.

The preset value GrcDuration is a duration value (expressed in a clock value) for determining whether the gate time of a note in question (i.e., a note to be determined) represents a length of a normal note or of a grace note. The values GrcTopIntervalMin and GrcTopIntervalMax are criterion or reference values for determining whether or not a note group containing the note in question is a grace note group; specifically, they represent, in clock values, minimum and maximum time intervals from a first or leading note (i.e., the note in question) in the grace note group to a normal note immediately following the note group. The value GrcTopNoteNum is a reference value for determining whether or not the note group containing the note in question is a grace note group; specifically, it represents a maximum distance or interval (i.e., a difference in note number) between the leading note (i.e., the note in question) in the grace note group and a normal note immediately following the note group. The values GrcIntervalMin and GrcIntervalMax are reference values for determining whether or not the note group containing the note in question is a glissando note group; specifically, they represent, in clock values, minimum and maximum time intervals (clock values) between a leading note in a grace or glissando note group and the note in question preceding that grace or glissando note group. The value GrcNoteNum is a reference value for determining whether or not the note group containing the note in question is a glissando note group; specifically, it represents a maximum interval (i.e., a difference in note number) between a leading note in a grace or glissando note group and the note in question preceding that grace or glissando note group. In the following description, the notation "note①+note②" means that note① and note② constitute a successive note group.

In the illustrated example, the following three conditions are set for detecting a state of "grace note $G_4$+normal note F" using the above-mentioned preset values:

(1) Note F has a gate time GT greater than the duration value GrcDuration and note $G_4$ preceding note F has a gate time GT below the duration value GrcDuration;

(2) Difference T between the note-on timing of note F and note $G_4$ is greater than the minimum time interval value GrcTopIntervalMin but smaller than the maximum time interval value GrcTopIntervalMax; and (3) Difference between the note numbers of note F and note $G_4$ is smaller than the maximum interval value GrcNoteNum. Only when all of the three conditions above are satisfied, the state of "grace note $G_4$+normal note F" is identified in the illustrated example.

The following three conditions must be satisfied for detecting a state of "grace note $G_{n-1}$+grace note $G_n$" using the above-mentioned preset values:

(1) Note $G_{n-1}$ has a gate time GT below the duration value GrcDuration;

(2) Difference T between the note-on timing of note F and note $G_{n-1}$ is greater than the minimum time interval value GrcTopIntervalMin but smaller than the maximum time interval value GrcTopIntervalMax; and (3) Difference between the note numbers of note F and note $G_{n-1}$ is smaller than the maximum interval value GrcNoteNum. Only when all of the three conditions above are satisfied, the state of "grace note $G_{n-1}$+grace note $G_n$" is identified in the illustrated example. This detection is repeated until a condition of "$G_{n-1}=G_1$" is met. Namely, this example sets the maximum number of notes in the grace note group to "four" and identifies note $G_1$ as the leading note in the grace note group.

Further, the following three conditions are set for detecting the state of "grace note $G_{n-1}$+grace note $G_n$" when "$G_{n-1}$" is not equal to "$G_1$", if a note preceding note $G_{n-1}$ is represented by $G_{n-2}$:

(1) Note $G_{n-2}$ has a gate time GT greater than the duration value GrcDuration;

(2) Difference T between the note-on timing of note F and note $G_{n-2}$ is greater than the maximum time interval value GrcTopIntervalMax; and (3) Difference between the note numbers of note F and note $G_{n-2}$ is greater than the maximum interval value GrcNoteNum. When at least one of the three conditions above is satisfied, the state of "grace note $G_{n-1}$+grace note $G_n$" is identified in the illustrated example. This example identifies note $G_{n-1}$ as the leading note in the grace note group.

Further, the following three conditions are set for detecting a glissando, if a note preceding note $G_1$ is represented by $G_0$:

(1) Note $G_0$ has a gate time GT below the duration value GrcDuration;

(2) Difference T between the note-on timing of note $G_0$ and note $G_1$ is greater than the minimum time interval value GrcIntervalMin but smaller than the maximum time interval value GrcIntervalMax; and (3) Difference between the note numbers of note $G_0$ and note $G_1$ is below the maximum interval value GrcNoteNum. Only when all of the three conditions above are satisfied, notes $G_1$ to $G_4$ are removed from a list of potential grace notes and notes $G_0$ to $G_4$ are identified as a note group of glissando. Note that if all of the three conditions are met for a note preceding the identified glissando note group, that preceding note is also identified as a glissando note.

Note data indicative of the grace and glissando notes detected in the above-mentioned manner is stored along with timing data into the RAM 3 in a predetermined format, for each of the tracks. For example, each detected grace note is stored as note data with an identification code specifying that the note data concerns a grace note. Each detected glissando is stored as note data along with a code attached to the first or leading note of the glissando note group to indicate the start of the note group and another code attached to the last note of the glissando note group to indicate the end of the note group; in this case, no intermediate note between the leading and last notes is stored in the RAM 3.

Detection of Arpeggio and Chord

Figure 15A:
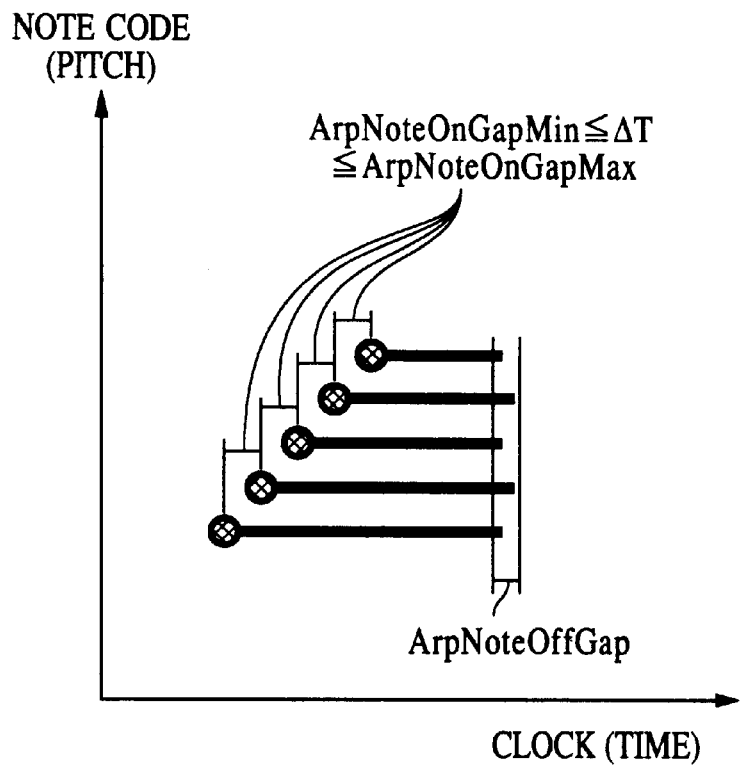
FIGS. 15A and 15B are diagrams explanatory of processes carried out in the preferred embodiment for detecting an arpeggio and chord, respectively.
Figure 15B:
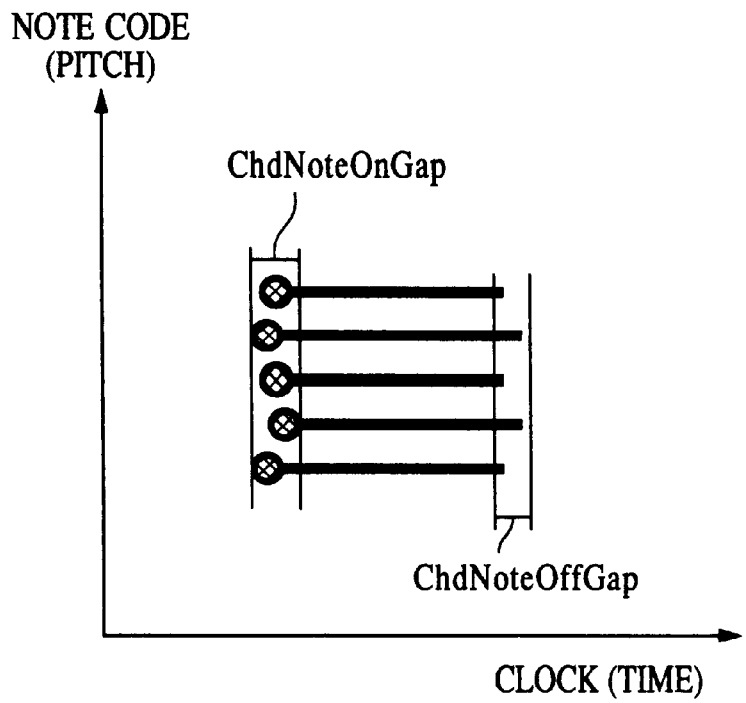

FIGS. 15A and 15B are diagrams explanatory of processes carried out in the embodiment for detecting an arpeggio and chord, respectively. The following preset values are used to prescribe various conditions for the arpeggio and chord detection. The preset values ArpNoteOnGapMin and ArpNoteOnGapMax represent minimum and maximum note-on intervals for identifying an arpeggio note group. The value ArpNoteOffGap represents a maximum allowable note-off interval for identifying an arpeggio note group. Further, the value ChdNoteOnGap represents a maximum allowable note-on interval for identifying a chord note group, while the value ChdNoteOffGap represents a maximum allowable note-off interval for identifying a chord note group.

In the illustrated example, the following three conditions are set for determining whether or not a plurality of notes are of an arpeggio note group:

(1) Difference between nth note-on timing and (n+1)th note timing is greater than the minimum interval value ArpNoteOnGapMin but smaller than the maximum interval value ArpNoteOnGapMax;

(2) Note-off timing of all the notes in the note group falls within a range not greater than the maximum allowable note-off interval value ArpNoteOffGap; and (3) Three or more notes are contained in the note group. Only when all of these three conditions are met, the notes are identified as an arpeggio note group in the illustrated example.

Arpeggio is generally performed in one of two different styles: a first style where chord component notes or passing notes are performed while being scattered over a plurality of beat positions, one or two different notes per beat position; and a second style where chord component notes are performed at a same beat position vertically in a top-to-bottom (downward) or bottom-to-top (upward) direction. The arpeggio detection process in the present embodiment is designed to detect the latter or second style of arpeggio performance. Once such an arpeggio note group is identified, the individual notes in the arpeggio note group are sequentially identified in the ascending order of their note-on timing values, i.e., beginning with the note having the earliest note-on timing, and then the performing direction (downward or upward direction) is identified from the pitches of the two notes having the earliest and latest note-on timing.

Further, the following two conditions are set for determining whether or not a plurality of notes are of a (non-arpeggio) chord notes group:

(1) Note-on timing of all the notes falls within a range not greater than the maximum allowable note-on interval ChdNoteOnGap; and (2) Note-off timing of all the notes falls within a range not greater than the maximum allowable note-off interval ChdNoteOffGap. Only when both of the two conditions are met, the notes are identified as a chord note group in the illustrated example. Once such a chord note group is identified, the note-on and note-off timing values of all the notes in the chord note group are adjusted to conform with respective earliest timing values in that chord note group.

Note data indicative of each of the arpeggio and chord note groups detected in the above-mentioned manner is stored along with timing data into the RAM 3 in a predetermined format, for each of the tracks. For example, each of the detected notes is stored as note data with an identification code specifying that the note data concerns an arpeggio or chord.

Whereas the preceding paragraphs have described the processes for detecting grace notes, glissando, arpeggio and chord, processes for detecting a tremolo, tuplet, and etc. can also be carried out on the basis of at least one of several musical factors, such as the number of successive notes, note-on timing and length of each of the notes, and differences (intervals) between their note numbers. Further, it should be obvious that the ornament detection processes may be carried out in any other manner than the above-mentioned.

After such ornaments as grace notes, glissando, tremolo, tuplet, arpeggio, and the like are detected at steps S4 to S6 of FIG. 12, the main control program or main routine moves on to step S7, where a quantization process is performed on the performance data to modify their tone-generation timing. The reason why the quantization process is executed after the ornament detection processes is that each ornament has very delicate tone-generation timing corresponding to a selected performance style and the ornament detection would become extremely difficult if executed after the quantization process. The preferred embodiment of the present invention, which is designed to execute the ornament detection processes before the quantization, can thus greatly facilitate the ornament detection.

The quantization process quantizes grace notes as follows. If beat timing exits in between grace note $G_1$ having the earliest note-on timing and note F (see FIG. 14), then the position of note F is modified to coincide with that beat timing. If a result of normal quantization of grace note $G_1$ having the earliest note-on timing coincides with the beat timing, then the position of note F is modified to coincide with the beat timing. In other cases, a result of the normal quantization of note F is adopted. Note that the grace notes themselves are not subjected to the quantization but are modified, simultaneously with the positional modification of note F, so as to maintain timing relationship with note F. In the quantization process, it is preferable that the gate time of note F be modified so that it coincides with a time length from the earliest note-on timing of note $G_1$ to the note-off timing of note F. Because, by so doing, a length of note C (higher C), reduced to that of "eighth note+quarter note" due to a subtle delay of tone generation timing in a grace note group (b) shown in FIG. 2B, can be represented by a half note as shown in a grace note group (b) of FIG. 2A, which allows the musical score to be displayed with an enhanced appearance so that it can be easily read with the human eye.

Further, for arpeggio notes, one of the notes having the earliest note-on timing is subjected to quantization, and the note timing and, if necessary, gate time of the other notes are modified to coincide with those of the quantized note. By thus modifying the gate time, slight differences in the note length (gate time) in the arpeggio note group, resulting from subtle differences in tone generation timing in the note group depicted by (a) of FIG. 2B, can be eliminated as shown in an arpeggio note group (a) of FIG. 2A, which allows the musical score to be displayed with an improved external appearance so that it can be read easily with the human eye.

Because the quantization process determines the respective positions or placement of the individual notes in accordance with the type of the detected ornament as described above, it is possible to faithfully reproduce the delicate tone-generation timing of the notes, irrespective of the execution of the quantization process.

After the quantization process of step S7, the main routine goes to step S8 in order to determine note lengths, such as those of half and quarter notes, on the basis of a specific number of note data within, for example, a single measure (whose length is defined by a clock value) and gate time of the note data. Then, at step S9, the main routine carries out processes for determining layout of the musical score and note-connecting "cross bar" or "beam", after which the layout process of FIG. 13 is performed at step S10.

After the note arrangement or placement on the two rows of staves is determined through the layout process, a process for determining a clef and an octave process are carried out at step S11. Then, the main routine moves on to step S12, where musical score forming data are created in a predetermined format on the basis of the results of the note layout process, clef determination process and octave process, and the thus-created musical score forming data are stored (saved), along with the automatic performance data, into the RAM 3 or external storage unit 11. The above-mentioned octave process in this embodiment is intended to move a position for displaying a particular note by an octave and impart an octave mark to the moved position, in such a situation where the note number of the particular note has been determined as being an octave higher or lower than a pitch range indicated by the clef mark.

Upon completion of these operations, the main routine creates image data of the musical score on the basis of the musical score forming data at step S13. At next step S14, the main routine carries out the score display process by passing the musical score image data to the display unit 9. At that time, for each of those regions where grace notes, glissando, or arpeggio have been detected, the musical score image data are created in the following manner. Namely, those notes with grace note codes added thereto are displayed in small-size images along with a slur mark connecting the notes and a normal note immediately following the same. Further, for notes with glissando codes added thereto, a wave-shaped line is displayed between the two notes to which are added the codes indicative of a start and end of the glissando. Moreover, notes with arpeggio codes added thereto, a wave-shaped line with an arpeggio-representing arrow head (oriented in a direction corresponding to the determined downward or upward performing direction).

Now, a detailed description will be made about the music layout and note-connecting beam determination processes of step S9, as well as the layout process of FIG. 13.

Music Layout Determination

Figure 16:
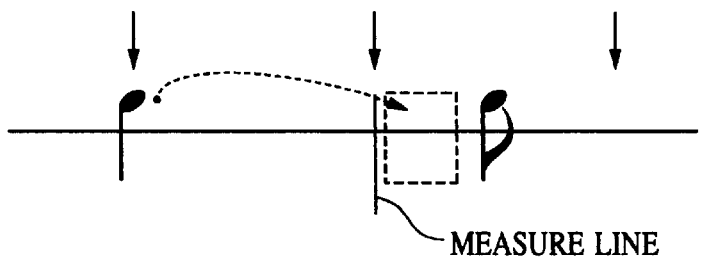
FIG. 16 is a diagram explanatory of dummy data employed in the preferred embodiment.

In the music layout determination process, a rest is determined from the timing data and gate times of two successive notes. If a time interval between the timing data between the two notes is considerably greater than the gate time of a first or preceding one of the notes, then rest data or the like is inserted after the first note data. In the event that no note data exists at the head of a beat (as denoted by broken line in FIG. 16) due to presence of a dotted note or dotted rest in the preceding measure (or at the preceding beat), dummy data is inserted into the head of the beat along with timing data indicative of the head beat position. The dummy data is such data regarded as a note that has a "zero" displayed width but can be counted as one note when counting the number of the notes as will be described later.

Beam Determination

If, for example, two successive eighth notes correspond to one beat or a succession of a dotted eighth note and 16th note corresponds to one beat, then the note-beam determination process is executed to connect together these notes by a beam (cross bar connecting the respective note stems), to provide a single note. Then, data identifying the beam-connected notes is stored into the RAM 3 along with the corresponding note data and timing data, for each of the tracks, in a predetermined format. In addition, image data of the beam connection mark is created, and a displayed width of the mark is determined, as necessary, on the basis of the number and type of the notes. Data indicative of the displayed width is then stored into the RAM 3 along with various score marks as shown in FIG. 11.

By the above-described music layout determination and beam determination processes, a note or rest type is determined, and note and rest types and timing data of the notes and rests (if the notes are connected by a beam, timing data of the leading data) are determined for each of the tracks. In this manner, data indicative of these note and rest types, data relating to the beam, data relating to the detected ornament, and dummy data are stored, along with the timing data, into the RAM 3 as a time-serial data (hereinafter "music layout data") in a predetermined format.

Layout Process

In the layout process of FIG. 13, the performance data of the two tracks are combined together at step S21, with reference to the music layout data. In this operation for combining the performance data, the note data of the two tracks are rearranged to provide a single time series of performance data, on the basis of a predetermined rule that those notes of the two tracks having different trigger timing are adopted as they are, but, for those notes of the two tracks having same trigger timing, the one of a shorter note length is adopted. Note that the above-mentioned rearranging rule is not applied to the grace notes, and, for the glissando note group, a length from the leading note to the last note in the group is determined as its total note length.

Figure 3:
FIG. 3 is a diagram showing the examples of performance data in staves before subjected to a predetermined music layout process.
Figures 4, 5A, 5B, 5C:
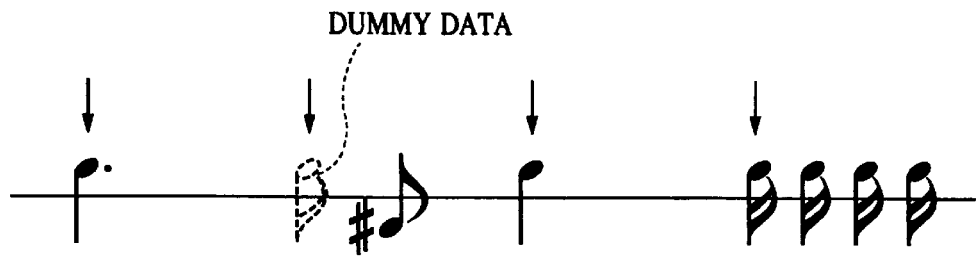
FIG. 4 is a diagram showing, in musical notation, data combined or synthesized in the preferred embodiment.
FIGS. 5A to 5C are diagrams explanatory of exemplary conditions for determining the number of measures and measure widths in the preferred embodiment.

The above-described operation for combining the performance data can thus create a single set of combined or synthesized performance data (hereinafter also called "synthesized data") distinct from the original performance data of the two tracks. FIG. 3 is a diagram showing an example of the performance data in staves before subjected to the layout process, and FIG. 4 is a diagram showing the synthesized data in notes; that is, the synthesized data of FIG. 4 are obtained by combining together the notes of the first track corresponding to the upper range represented by the G clef of FIG. 3 and the notes of the second track corresponding to the lower range represented by the F clef. Note that FIG. 4 shows only the synthesized data in the first measure.

Namely, because a dotted quarter note and half note appear on the first and second tracks, respectively, at the first beat position (the first and subsequent beat positions are each denoted by a downward arrow) of FIG. 3, the dotted quarter note is employed as synthesized data at the first beat of FIG. 4. Although no note appears on both of the first and second tracks at the second beat position of FIG. 3, dummy data, to be regarded as a single note, is inserted in FIG. 4 to fill a blank resulting from the half beat (equal to the dot) of the dotted quarter note employed at the first. Then, whereas an eighth note appears between the second and third beats on the first track of FIG. 3, there is no note on the second track, so that the eighth note of the first track is employed as synthesized data. At the third beat position, a quarter note appears on both of the first and second tracks of FIG. 3, so that the quarter note is employed as synthesized data of FIG. 4. Further, a quarter note and 16th note appear on the first and second tracks, respectively, at the fourth beat position of FIG. 3, so that the 16th note is employed as synthesized data at the fourth beat of FIG. 4; because only the second track includes three other 16th notes within the fourth beat position, these three 16th notes are directly employed as synthesized data. These procedures result in the synthesized data as shown in FIG. 4.

After the synthesized data are obtained in the above-mentioned manner, these synthesized data are allocated at and after step S22 of FIG. 13. Namely, the instant embodiment first sets a specific number of measures to be included in the first-row staff and a width of each of the measures, lays out beat positions within the individual measures, and lays out note positions within the individual beats. In determining the number of measures to be included in the first-row staff and the width of the measures, there are employed nine layout conditions with respective priorities as specified in Table below. The individual layout conditions are selected sequentially in accordance with the respective priorities. In FIG. 5, there are shown examples of these layout conditions, where at least one of the rows shares the same number of measures and same measure width between the upper and lower ranges; note that numerical values in each of FIGS. 5A to 5C represent measure numbers allotted to the individual measures.

TABLE

| Priority | Condition |
|---|---|
| 1 | Each row has four measures of an equal width (FIG. 5A). |
| 2 | Each row has four measures of variable widths (FIG. 5B). |
| 3 | First set includes two rows each having three measures of an equal width, and a second set includes two rows each having five measures of variable widths (FIG. 5C). |
| 4 | First set includes two rows each having three measures of variable widths, and a second set includes two rows each having five measures of variable widths. |
| 5 | First set includes two rows each having two measures of an equal width, and a second set includes two rows each having two measures of an equal width. |
| 6 | First set includes two rows each having two measures of variable widths, and a second set includes two rows each having two measures of variable widths. |
| 7 | First set includes two rows each having a single measure, and a second set includes two rows each having three measures of variable widths. |
| 8 | First two sets each include two rows each having a single measure, and a next set includes two rows each having two measures of variable widths. |
| 9. | Four sets each include two rows each having a single measure. |

For sequential selection of the above-mentioned layout conditions, a value "1" is first set, at step S22 of FIG. 13, as a priority number N. Then, operations of steps S23 to S26 are repetitively carried out until the intended layout is completed successfully, while sequentially selecting the layout conditions through incrementing of the priority number N at step S26 and subsequent determination at step S27.

Namely, step S23 determines the number of measures and measure widths under the layout condition corresponding to the currently-set priority number N, and step S24 carries out an intra-measure layout operation for determining beat positions within each individual measure and an intra-beat layout operation for determining note positions within each individual beat. The measure width determination, intra-measure layout operation and intra-beat layout operation will be described in detail later.

Then, at step S25 following step S24, a determination is made as to whether the layout results satisfy predetermined requirements (e.g., no overlap between the notes). If an affirmative (YES) determination is made, the process returns to the main routine, but if not (NO), the priority number N is incremented by one at step S26 to lower the priority by one. After that, it is further determined at step S27 whether the current priority number N is "10" or not. If the priority number N is not "10", the process loops back to step S23, but if N=10, the process executes the layout while permitting overlaps between the notes and then returns to the main routine.

Measure Width Determination

Although the total length of each staff row can be represented by a specific number of pixels on the display screen such as the liquid crystal display panel, it is represented herein by a numerical value with no unit merely for convenience of description; more specifically, the total length of each staff row will be described as "100" which does not include the length of the clef region.

Under the condition where the measures have an equal width, the total staff length "100" is divided equally by the number of measures corresponding to the currently-selected layout condition, and each equally divided length is determined as a measure length as long as the length is not smaller than a value of "(displayed widths of note, rest and grace note marks)×K (e.g., K=1.0 or more)" for each measure.

On the other hand, under the condition where the measures have variable lengths, the minimum necessary measure width is set as an offset value A for each of the measures, and a remainder obtained by subtracting each of the offset values A from a total length of one staff row is allocated in accordance with the total number of the notes within each of the measures. The total number of the notes within each of the measures is counted as follows in the preferred embodiment. First, the dummy data should be counted in addition to the normal notes. Further, for those notes detected as grace notes other than glissando notes, all the grace notes as a whole should be counted as a single note, and every tuplet should also be counted as a single note. Furthermore, for each glissando note group, only the leading and last notes should be counted.

Figure 6:
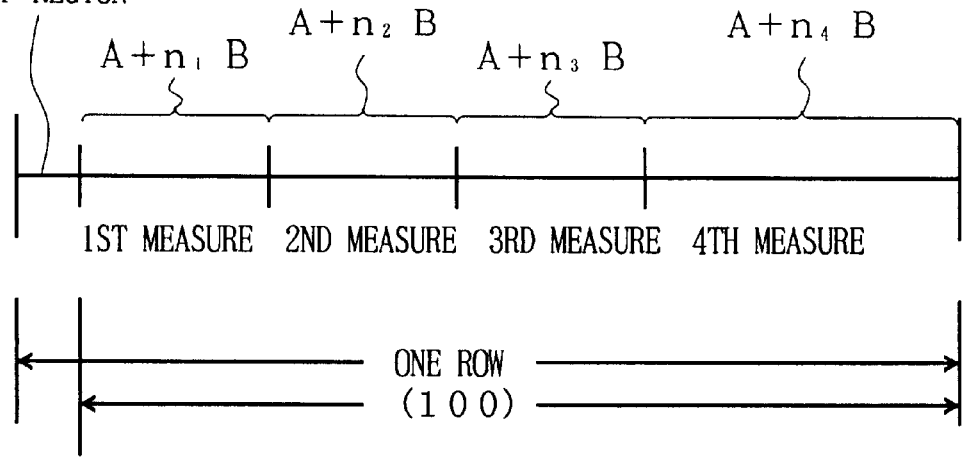
FIG. 6 is a diagram explanatory of an example of measure layout process in relation to a case where the measures have variable widths.

FIG. 6 is a diagram explanatory of an example of the measure layout operation in the case where the measures have variable widths and, more specifically, where one staff row is divided into four variable-width measures. As illustrated, the following relationship is established, if the numbers of notes within the individual measures are represented by "$n_1$" to "$n_4$" and a width increase per note is represented by "B":

$$100=(A+n_1B)+(A+n_2B)+(A+n_3B)+(A+n_4B)$$

$$\therefore B=(100-4A)/(n_1+n_2+n_3+n_4)$$

Because the staff is divided into four measures, $0 \leq A \leq 25$; if the offset A is set to 12.5 that is 50% of the maximum value of "25", the value of the per-note width increase B is determined accordingly, and thus respective widths, $(A+n_1B)$, $(A+n_2B)$, $(A+n_3B)$, $(A+n_4B)$, of the individual measures can be determined.

Intra-measure Layout

Figure 7:
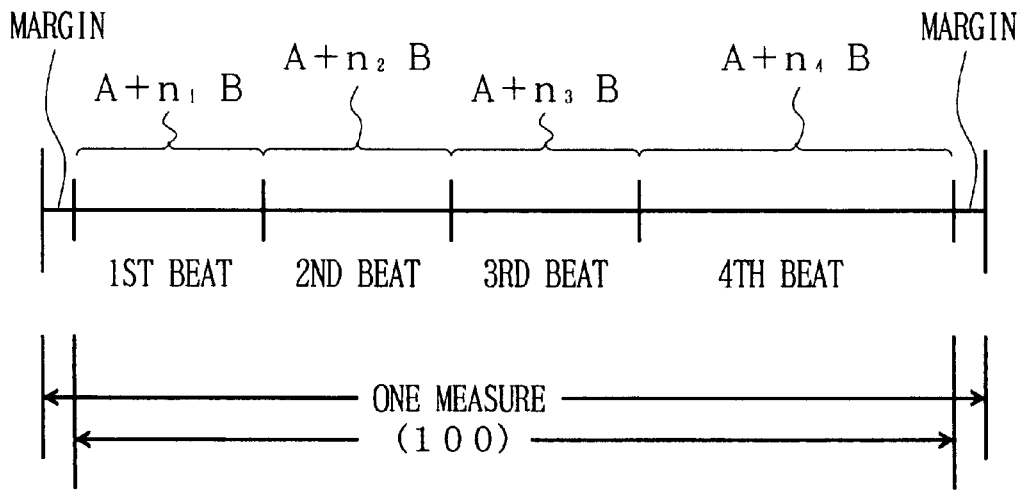
FIG. 7 is a diagram explanatory of an example of an intra-measure operation carried out in the preferred embodiment.

The intra-measure layout operation is intended to determine a width (hereinafter called a "beat width") between the heads of adjacent beats in each of the measures. FIG. 7 is a diagram explanatory of an example of the intra-measure layout operation in relation to a 4/4-time case (where each measure has four beats). This intra-measure layout operation is carried out in a similar manner to the above-described measure width determination operation. If the total length of each measure is set as "100" (with opposite end margins of the measure excluded), the minimum necessary width of each note is set as an offset A, the per-note width increase is represented by B, and the numbers of notes at the individual beats are represented by $n_1$, $n_2$, $n_3$, $n_4$, respectively, then the following relationship is established; assume here $n_1=1$ because it is considered that the layout corresponding to the timing data allows the notes to be appropriately allocated within the measure as long as the number of the notes per beat is not greater than two.

$$100=(A+n_1B)+(A+n_2B)+(A+n_3B)+(A+n_4B)$$

$$\therefore B=(100-4A)/(n_1+n_2+n_3+n_4)$$

Because the measure has four beats, $0 \leq A \leq 25$; if the offset A is set to 18.75 that is 75% of the maximum value of "25", the value of the per-note width increase B is determined accordingly, and thus the respective widths, $(A+n_1B)$, $(A+n_2B)$, $(A+n_3B)$, $(A+n_4B)$, of the individual beat widths can be determined.

Specifically explaining the case of FIG. 4, $n_1=1$ and $n_2=1$ (i.e., the number of the notes is less than two), and $n_3=1$ and $n_4=4$. Therefore, $100=4A+7B$, and $B=100/7-4A/7$. Assuming that the per-note offset A is 18.75, then the width increase B becomes 3.57. Thus, the beat widths of the first, second and third beats each amount to 22.32 and the beat width of the fourth beat becomes 33.03.

[Intra-beat Layout]

For each of the beats determined in the above-mentioned manner, the intra-beat layout operation determines whether or not all the notes at the beat can be displayed appropriately within the beat width. Namely, if the total displayed width W of all the normal and grace note marks within the beat is not greater than the beat width, it is determined that all of these note marks can be appropriately displayed; otherwise, it is determined that all of these note marks can not be appropriately displayed. If all the note marks are not appropriately displayable, a "NO" is made at step S25 of FIG. 13, and the above-mentioned operations are performed again beginning with the processes for determining the number of measures and measure width.

Figure 8:
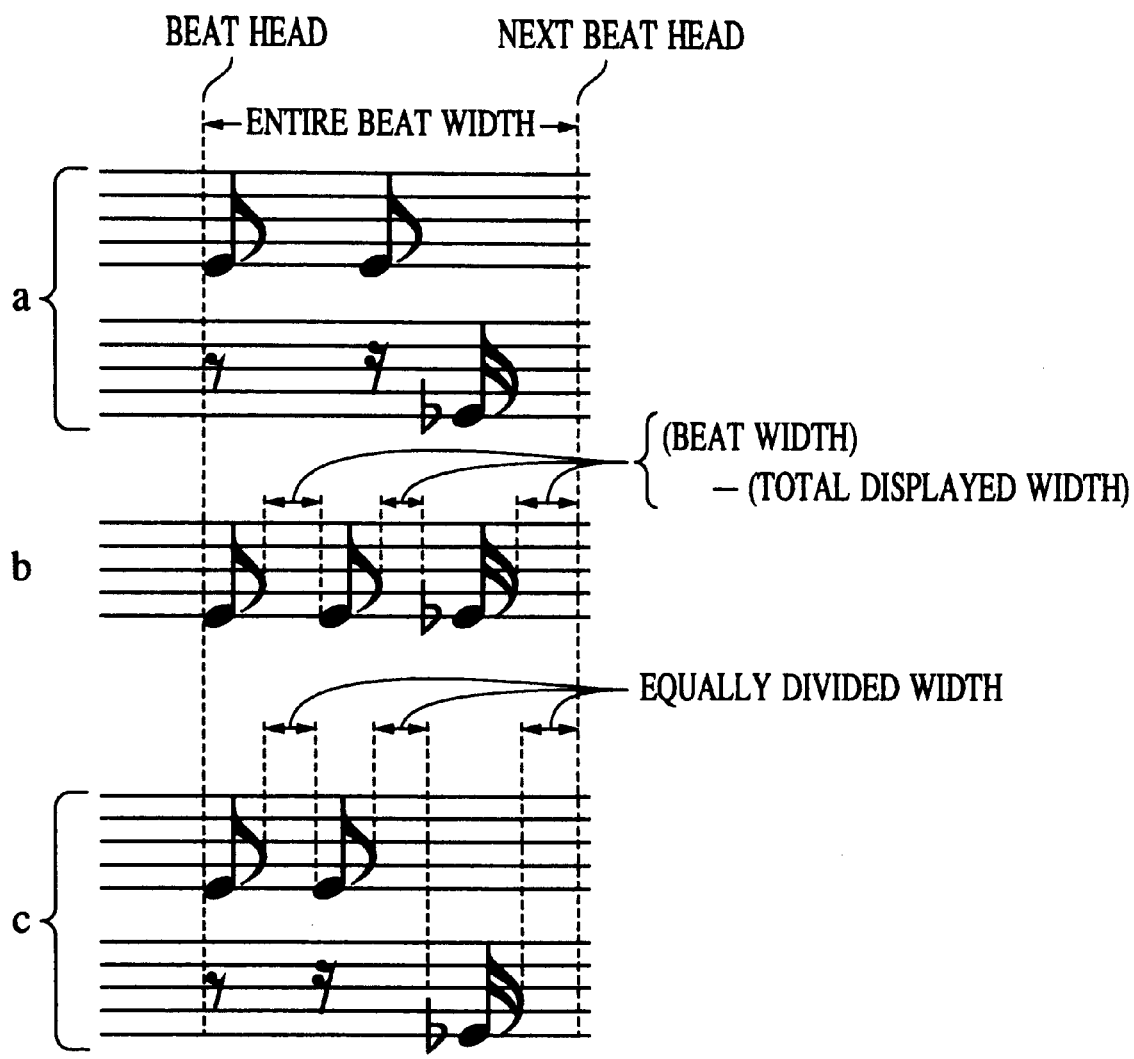
FIG. 8 is a diagram explanatory of an example of an intra-beat layout operation carried out in the preferred embodiment.

When all of the note marks have been determined as appropriately "displayable", the total displayed width W is subtracted from the beat width, and the remainder from the subtraction is divided equally by the number of the notes to be allotted to the individual notes. FIG. 8 is a diagram explanatory of an example of the intra-beat layout operation. Assume here that two eighth notes are present on the first track while an eighth note, 16th rest and 16th note are present on the second track, as depicted in section "a" of FIG. 8. Where a provisional mark ("♭" in the illustrated example) is attached with the 16th note, the widths including that of the provisional mark are set as the displayed width.

As these notes are placed optionally within the beat width, the subtraction of the individual displayed widths from the corresponding beat widths produces remaining spaces, as depicted in section "b", which mean that all of the note marks are appropriately displayable, so that the layout operation equally divides the remaining spaces and allot them to the individual notes. Thus, the respective positions of the individual notes are determined by adding the equally-divided space to the end of the displayed width of each of the notes, as depicted in section "c" of FIG. 8. Note that because the displayed lengths of the rest marks are smaller than those of the note marks in the illustrated example, these rest marks may be put at the same position as the corresponding note marks. Then, by rearranging the notes on the first and second tracks with the thus-determined positions (i.e., positions in the horizontal direction of the staves) unchanged, it is possible to display the musical score with all the corresponding beat positions of the upper and lower staves aligned with each other in an accurate manner.

Figure 1:
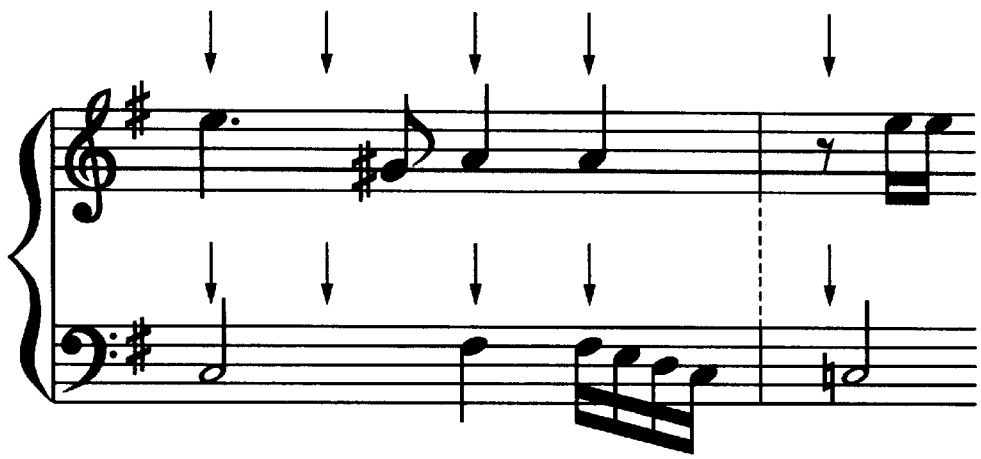
FIG. 1 is a diagram showing an example of a musical score displayed in accordance with a preferred embodiment of the present invention.

FIG. 1 is a diagram showing an example of a musical score displayed, for the performance data of FIG. 3, in accordance with the preferred embodiment of the present invention. If the musical score is laid out directly on the basis of the original performance data of the two tracks, then the beat positions (arrowed positions) of the two tracks would undesirably misalign or deviate from each other as illustrated in FIG. 3; however, carrying out the above-described operations after combining or synthesizing the performance data of the two tracks can lay out the musical score appropriately with the corresponding beat positions of the two tracks accurately aligned with each other.

Figure 2A:
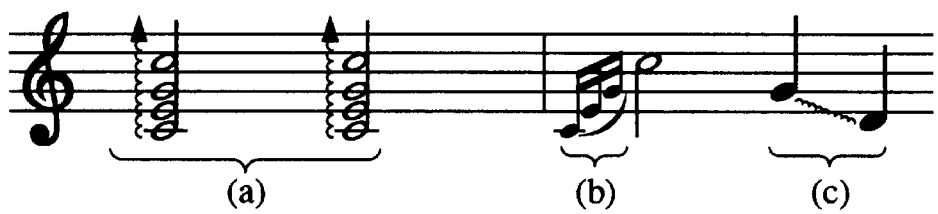
FIG. 2A is a diagram showing examples of notes displayed in conjunction with ornament marks in accordance with the preferred embodiment.
Figure 2B:
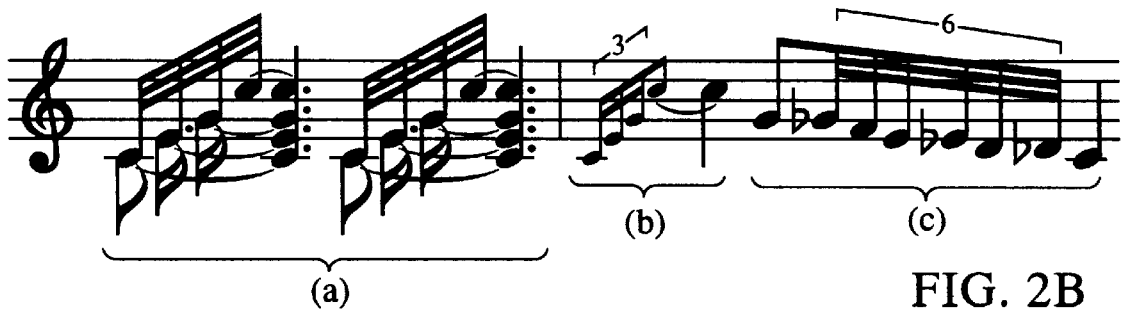
FIG. 2B is a music diagram showing examples of performance data corresponding to the notes.

Further, FIG. 2A is a diagram exemplarily showing ornament marks displayed in accordance with the preferred embodiment, and FIG. 2B is a diagram showing the performance data displayed in the form of the corresponding notes. If the performance data are represented on the musical score only by the normal notes, slight differences of tone-generation timing would occur in each arpeggio note group as depicted in section (a) of FIG. 2B, so that the notes would be displayed as unintended dotted notes. Further, the notes in each grace note group (as depicted in section (b) of FIG. 2B) and glissando note group (as depicted in section (c) of FIG. 2B) would be densely packed; whether these notes are of the grace note group or of the glissando note group can not be readily identified in such displayed conditions. However, if displayed by predetermined ornament marks in accordance with the preferred embodiment, the arpeggio note groups in section (a) of FIG. 2A can be prevented from being erroneously displayed as unintended, complex dotted notes, because they are each expressed in a combination of a predetermined arpeggio mark and chordal notes (i.e., notes positioned at the same tone-generation timing) as seen in section (a) of FIG. 2A. Similarly, the glissando note group can be prevented from being densely packed and can be shown on the musical score in a readily-identifiable form, because it is expressed by a combination of a predetermined glissando mark and leading and last notes in the group as seen in section (c) of FIG. 2A. In addition, the grace note group can also be prevented from being densely packed for a similar reason as seen in section (b) of FIG. 2A. As a consequence, the arpeggio, grace and glissando note groups can be readily distinguished from each other or identified as such, which allows the displayed musical score to be read with maximized ease. In addition, the number of notes to be displayed for the arpeggio note group (section (a)) or the glissando note group (section (c)) can be significantly reduced, which thus allows the musical score to be displayed within a smaller area.

Whereas the preferred embodiment has been described above in relation to the case where performance data of two parts are allocated to two rows of staves, the present invention may of course be applied to the case where performance data of three or more parts are allocated to three or more rows of staves. In such a case too, the performance data may be either in the format where the data of a plurality of channels are mixedly combined into a single track or in the format where the data of these channels are separated into respective tracks.

It should also be appreciated that the term "parts", which is generally used to represent various types of musical instruments and various voices of a chorus, may be construed as representing proportions of performance data that are suitable for being presented on a musical score in a plurality of rows of staves.

Whereas the performance data for use in the described embodiment have described as prepared in the so-called "event plus absolute time" format where respective occurrence times of individual note data are each expressed by an absolute time within a music piece or measure, they may be in any other format, such as the "event plus relative time" format where respective occurrence times of performance events are each expressed by an elapsed time from a preceding or most recent event, or the so-called "solid" format where a memory location is allocated for each minimum resolution unit of a tone generation event (clock pulse in the described embodiment) and each data of a note number, velocity or the like is stored at one of the memory locations corresponding to an occurrence time of the tone generation event.

Further, whereas the preferred embodiment has been described above in relation to the case where the music layout program is prestored in the ROM 2, the present invention is not so limited. For example, the music layout program may be prestored in a CD-ROM so that the program can be loaded from the CD-ROM device to a hard disk and the CPU 1 can transfer the layout program from the hard disk to the RAM 3 for storage therein. Then, the CPU 1 may control the music layout operations on the basis of the layout program thus-stored in the RAM 3 in a similar manner to the described embodiment. By so doing, the CPU can operate in exactly the same way as where the music layout program is prestored in the ROM 2. This alternative arrangement will greatly facilitate installation or version-up of the layout program, addition of a new music layout program, or the like. Alternatively, the music layout program may be prestored on a floppy disk, magneto-optical (MO), or the like and supplied therefrom to the RAM 3 or hard disk.

Furthermore, the music layout program may be downloaded by use of the communication interface 13. In this case, the communication interface 13 is connected to the communication network B, such as a LAN (Local Area Network), Internet, and telephone line network, so as to receive the layout program from the server computer C via the communication network B and record the received program onto the hard disk for completion of the necessary program downloading.

The present invention may be embodied as other types of electronic musical instruments than the above-described keyboard-type instrument; for example, the present invention may be embodied as a discrete-type electronic musical instrument where a tone generator unit, sequencer, effector, and etc. are provided separately from each other and connected such as via MIDI and/or communication means such as a communication network.

Further, whereas the preferred embodiment has beenn described above as applied to an electronic musical instrument, the music layout device of the present invention may also be implemented by a combined use of a personal computer and application software, where the CPU of the personal computer carries out the necessary control on the basis of the operating system (OS) installed in, for example, a hard disk and using the working areas of the RAM. In such a case, the performance data and music layout program may be supplied to the hard disk from an external storage device as in the above-described embodiment, so that the CPU can operate in the same way as in the above-described embodiment. Selection of any of the performance data and data relating to the music layout can be controlled easily by data entry responsive to operation of the keyboard and/or mouse. Even where the personal computer is used like this, the data and program may be received via a network.

Note that the recording medium containing the music layout program as described above in relation to the preferred embodiment, i.e., the ROM, RAM, hard disk, CD-ROM, magneto-optical disk, DVD, or storage unit in the server computer on the communication network, corresponds to a recording medium storing the music layout program of the present invention.

In summary, according to the music layout device or method or the music layout program of the present invention, a placement of individual notes is determined on the basis of timing information synthesized from respective timing information contained in performance data for a plurality of parts, and score marks are allocated to rows of staves corresponding to the parts in light of the thus-determined note placement. This arrangement allows a musical score to be displayed with an enhanced appearance with corresponding beat positions and etc. of the staves accurately aligned with each other.

Further, with the music layout device or method or the music layout program according to another aspect of the present invention, an ornament is detected on the basis of the timing information included in the performance data, the performance data are modified in accordance with the detected ornament, and then ornament marks corresponding to the detected ornament and note marks corresponding to the performance data are allocated to the staff. By thus representing each ornamental region in predetermined ornament mark, the present invention achieves display of a musical score having an enhanced appearance.

Furthermore, with the music layout device or method or the music layout program according to still another aspect of the present invention, it is possible to accurately allocate notes of an ornament to positions specific to the ornament even though the notes are subjected to quantization, while still achieving the above-mentioned advantageous results.

What is claimed is:

1. A music layout apparatus for allocating score marks to a plurality of rows of staves on the basis of performance data for a plurality of parts, including timing information of performance events, said music layout apparatus comprising:

a display device adapted to display a musical score; and a processor coupled with said display device, said processor being adapted to:

combine the timing information included in the performance data for the plurality of parts, determine positions of notes on the basis of the combined timing information, and allocate note marks to the rows of staves corresponding to the parts in light of the determined positions of notes.

2. A music layout apparatus as recited in claim 1,
wherein said processor is adapted to combine said timing information included in the performance data for the plurality of part into a single timing information series in order of performance trigger timing, and
wherein when two or more of the performance data share same performance trigger timing, the timing information of one of the performance data, which shares the same performance trigger timing and which corresponds to a shorter note length, is selected to be incorporated into the timing information series.

3. A music layout apparatus as recited in claim 1,
wherein said processor is adapted to determine said positions of the notes by determining layout of individual measures and layout of notes at individual beats within each of the measures on the basis of the combined timing information and defining the determined layout as a common layout to the plurality of parts, and
wherein said processor is adapted to allocate said note marks to the rows of staves corresponding to the parts, on the basis of the performance data for each of the parts, in accordance with the common layout.

4. A music layout device for allocating score marks to a plurality of rows of staves on the basis of performance data for a plurality of parts including timing information of performance events, said music layout device comprising:
   means for combining the timing information included in the performance data for the plurality of parts;
   means for determining positions of notes on the basis of the timing information combined by said means for combining; and
   means for allocating note marks to the rows of staves corresponding to the parts in light of the positions of the notes determined by said means for determining.

5. A music layout apparatus for allocating score marks to a staff on the basis of performance data for a plurality of parts, including timing information of performance events, said music layout apparatus comprising:
   a display device adapted to display a musical score; and
   a processor coupled with said display device, said processor being adapted to detect an ornament from among the performance data on the basis of the timing information included in the performance data,
   modify the performance data in response to detection of the ornament, and
   allocate, to the staff, an ornament mark corresponding to the detected ornament and note marks corresponding to the modified performance data.

6. A music layout apparatus as recited in claim 5,
wherein said processor is further adapted to determine a position of each note to be quantized in accordance with the ornament detected from among the performance data to thereby carry out a quantization process on the performance data, and
wherein said processor is further adapted to allocate said score marks to the staff on the basis of the notes having been subjected to the quantization process.

7. A music layout device for allocating score marks to a staff on the basis of performance data for a plurality of parts, including timing information of performance events, said music layout device comprising:
   a detection section that detects, from among the performance data, a note group corresponding to a glissando performance style on the basis of the timing information included in the performance data;
   a conversion section that converts the performance data relating to said note group detected by said detection section into performance data imparted with a glissando-indicating code; and
   a section that allocates, to the staff, a predetermined glissando mark and note marks corresponding to the performance data converted by said conversion section and imparted with the glissando-indicating code, as score marks corresponding to the note group detected by said detection section.

8. A music layout device as recited in claim 7,
wherein said conversion section converts the performance data relating to the detected note group into performance data including a number of notes smaller than a total number of notes in the detected note group and having a total note length corresponding to a total note length of the detected note group.

9. A music layout device for allocating score marks to a staff on the basis of performance data for a plurality of parts, including timing information of performance events, said music layout device comprising:
   a detection section that detects, from among the performance data, a note group corresponding to an arpeggio performance style on the basis of the timing information included in the performance data;
   a conversion section that converts the performance data relating to said note group detected by said detection section into performance data imparted with an arpeggio-indicating code; and
   a section that allocates, to the staff, a predetermined arpeggio mark and note marks corresponding to the performance data converted by said conversion section and imparted with the arpeggio-indicating code, as score marks corresponding to the note group detected by said detection section.

10. A music layout device as recited in claim 9 wherein said conversion section converts the performance data relating to the detected note group into performance data of notes represented as a chord.

11. A music layout device for allocating score marks to a staff on the basis of performance data for a plurality of parts including timing information of performance events, said music layout device comprising:
   a detection section that detects, from among the performance data, a note group corresponding to an ornament on the basis of the timing information included in the performance data;
   a section that determines a position of each note to be quantized in accordance with the ornament detected by said detection section to thereby carry out a quantization process on the performance data; and
   a section that allocates, to the staff, an ornament mark corresponding to the detected ornament and note marks corresponding to the performance data having been subjected to the quantization process.

12. A music layout method for allocating score marks to a plurality of rows of staves on the basis of performance data for a plurality of parts including timing information of performance events, said music layout method comprising the steps of:
   combining the timing information included in the performance data for the plurality of parts;
   determining positions of notes on the basis of the timing information combined by said step of combining; and
   allocating predetermined note marks to the rows of staves corresponding to the parts in light of the positions of the notes determined by said step of determining.

13. A music layout method for allocating score marks to a staff on the basis of performance data for a plurality of parts, including timing information of performance events, said music layout method comprising the steps of:

detecting, from among the performance data, an ornament on the basis of timing information included in the performance data;

modifying the performance data in response to the detection of the ornament; and allocating, to the staff, an ornament mark corresponding to the detected ornament and note marks corresponding to the modified performance data.

14. A music layout method for allocating score marks to a staff on the basis of performance data for a plurality of parts, including timing information of performance events, said music layout method comprising the steps of:

detecting, from among the performance data, a note group corresponding to a glissando performance style on the basis of the timing information included in the performance data;

converting the performance data relating to said note group detected by said step of detecting into performance data imparted with a glissando-indicating code; and allocating, to the staff, a predetermined glissando mark and note marks corresponding to the performance data converted by said step of converting and imparted with the glissando-indicating code, as score marks corresponding to the note group detected by said step of detecting.

15. A music layout method for allocating score marks to a staff on the basis of performance data for a plurality of parts, including timing information of performance events, said music layout method comprising the steps of:

detecting, from among the performance data, a note group corresponding to an arpeggio performance style on the basis of the timing information included in the performance data;

converting the performance data relating to said note group detected by said step of detecting into performance data imparted with an arpeggio-indicating code; and allocating, to the staff, a predetermined arpeggio mark and note marks corresponding to the performance data converted by said step of converting and imparted with the arpeggio-indicating code, as score marks corresponding to the note group detected by said step of detecting.

16. A music layout method for allocating score marks to a staff on the basis of performance data for a plurality of parts, including timing information of performance events, said music layout method comprising the steps of:

detecting, from among the performance data, a note group corresponding to an ornament on the basis of the timing information included in the performance data;

determining a position of each note to be quantized in accordance with the ornament detected by said step of detecting;

carrying out a quantization process on the performance data in accordance with a determination by said step of determining; and allocating, to the staff, an ornament mark corresponding to the detected ornament and note marks corresponding to the performance data having been subjected to the quantization process.

17. A machine-readable recording medium for use in a music layout process for allocating score marks to a plurality of rows of staves on the basis of performance data for a plurality of parts including timing information of performance events, said recording medium containing program instructions executable by a processor to perform the steps of:

combining the timing information included in the performance data for the plurality of parts;

determining positions of notes on the basis of the timing information combined by said step of combining; and allocating note marks to the rows of staves corresponding to the parts in light of the positions of the notes determined by said step of determining.

18. A machine-readable recording medium for use in a music layout process for allocating score marks to a staff on the basis of performance data for a plurality of parts including timing information of performance events, said recording medium containing program instructions executable by a processor to perform the steps of:

detecting, from among the performance data, an ornament on the basis of the timing information included in the performance data;

modifying the performance data in response to detection of the ornament; and allocating, to the staff, an ornament mark corresponding to the detected ornament and note marks corresponding to the modified performance data.

19. A machine-readable recording medium for use in a music layout process for allocating score marks to a staff on the basis of performance data for a plurality of parts, including timing information of performance events, said recording medium containing program instructions executable by a processor to perform the steps of:

detecting, from among the performance data, a note group corresponding to a glissando performance style on the basis of the timing information included in the performance data;

converting the performance data relating to said note group detected by said step of detecting into performance data imparted with a glissando-indicating code; and allocating, to the staff, a predetermined glissando mark and note marks corresponding to the performance data converted by said step of converting and imparted with the glissando-indicating code, as score marks corresponding to the note group detected by said step of detecting.

20. A machine-readable recording medium for use in a music layout process for allocating score marks to a staff on the basis of performance data for a plurality of parts, including timing information of performance events, said recording medium containing program instructions executable by a processor to the perform the steps of:

detecting, from among the performance data, a note group corresponding to an arpeggio performance style on the basis of the timing information included in the performance data;

converting the performance data relating to said note group detected by said step of detecting into performance data imparted with an arpeggio-indicating code; and allocating, to the staff, a predetermined arpeggio mark and note marks corresponding to the performance data converted by said step of converting and imparted with the arpeggio-indicating code, as score marks corresponding to the note group detected by said step of detecting.

21. A machine-readable recording medium for use in a music layout process for allocating score marks to a staff on the basis of performance data for a plurality of parts, including timing information of performance events, said recording medium containing program instructions executable by a processor to perform the steps of:

detecting, from among the performance data, a note group corresponding to an ornament on the basis of the timing information included in the performance data;

determining a position of each note to be quantized in accordance with the ornament detected by said step of detection;

carrying out a quantization process on the performance data in accordance with a determination by said step of determining; and allocating, to the staff, an ornament mark corresponding to the detected ornament and note marks corresponding to the performance data having been subjected to the quantization process.

22. A music layout apparatus for allocating score marks to a staff on the basis of performance data for a plurality of parts, including timing information of performance events, said music layout apparatus having a processor adapted to:

detect, from among the performance data, a note group corresponding to a glissando performance style on the basis of the timing information included in the performance data;

convert the performance data relating to said detected note group into performance data imparted with a glissando-indicating code; and allocate, to the staff, a predetermined glissando mark and note marks corresponding to the converted performance data that is imparted with the glissando-indicating code, as score marks corresponding to the detected note group.

23. A music layout apparatus for allocating score marks to a staff on the basis of performance data for a plurality of parts, including timing information of performance event, said music layout apparatus having a processor adapted to:

detect, from among the performance data, a note group corresponding to an arpeggio performance style on the basis of the timing information included in the performance data;

convert the performance data relating to said detected note group into performance data imparted with an arpeggio-indicating code; and allocate, to the staff, a predetermined arpeggio mark and note marks corresponding to the converted performance data that is imparted with the arpeggio-indicating code, as score marks corresponding to the detected note group.

24. A music layout apparatus for allocating score marks to a staff on the basis of performance data for a plurality of parts, including timing information of performance events, said music layout apparatus having a processor adapted to:

detect, from among the performance data, a note group corresponding to an ornament on the basis of the timing information included in the performance data;

determine a position of each note to be quantized in accordance with the detected ornament to thereby carry out a quantization process on the performance data; and allocate, to the staff, an ornament mark corresponding to the detected ornament and note marks corresponding to the performance data having been subjected to the quantization process.

* * * * *